Oct. 11, 1960  W. J. REAP  2,956,233
FEEDBACK LATCH
Filed May 15, 1958
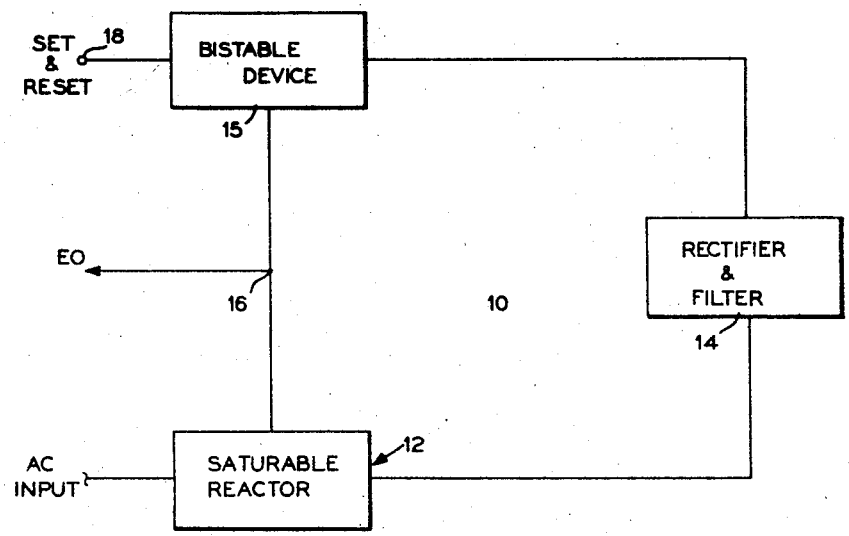
FIG_1_
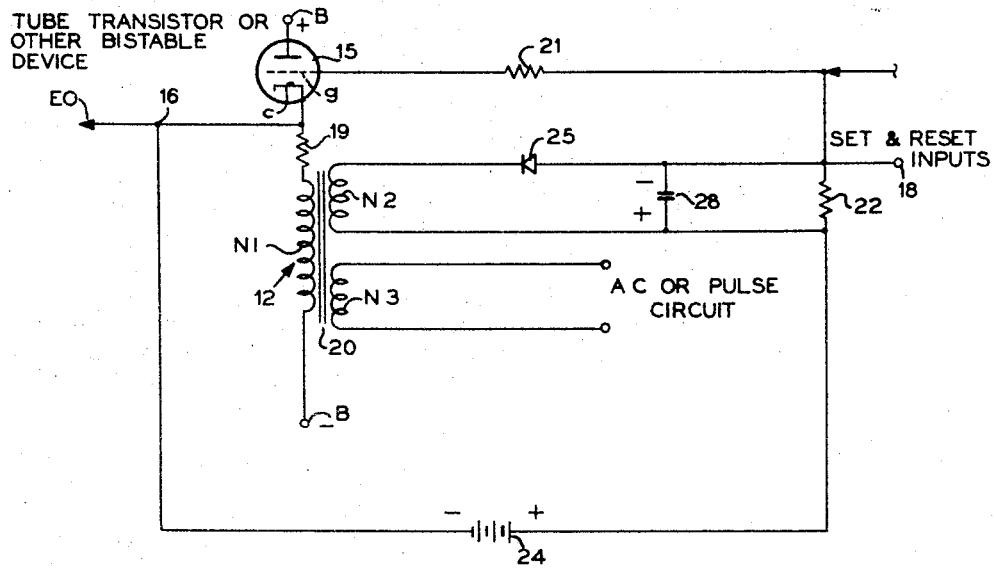
FIG_2_
INVENTOR.
WILLIAM J. REAP
BY
Francis V. Giolma
ATTORNEY United States Patent Office 2,956,233
Patented Oct. 11, 1960

2,956,233

FEEDBACK LATCH

William J. Reap, Endicott, N.Y., assignor to International Business Machines Corporation, New York, N.Y., a corporation of New York Filed May 15, 1958, Ser. No. 735,410

9 Claims. (Cl. 328—225)

This invention relates generally to latches, and it has reference in particular to a saturable reactor controlled latch.

Generally stated, it is an object of this invention to provide a latch that is simple and inexpensive to manufacture, and is reliable and effective in operation.

More specifically, it is an object of the invention to provide for using a controllable switch to determine the state of a saturable reactor which is effective to maintain the switch in either of two conditions which determine the particular state of the reactor.

More specifically, it is an object of this invention to provide for using a tube as a switch to energize the saturating winding of a saturable reactor, which operates to block a feedback circuit from the reactor which tends to hold the tube in the off condition when the reactor is unsaturated.

Yet another object of the invention is to provide in a latch for rectifying a transformer output from a saturable reactor to bias a tube to the off condition, and for using the tube to energize a saturating winding on the reactor, so as to block transformer action production of the biasing output.

It is also an object of this invention to provide for using a periodic electrical quantity to control a saturable reactor for biasing a controllable switch device, which in turn controls energization of a saturating winding on the reactor.

Other objects of the invention will be pointed out in the following description and claims and illustrated in the accompanying drawing, which discloses, by way of example, the principle of the invention and the best mode, which has been contemplated, of applying that principle.

In the drawing:

Fig. 1 is a schematic block diagram of a feedback latch embodying the principles of the invention in one of its forms, and Fig. 2 is a circuit diagram of a saturable reactor controlled feedback latch, such as shown schematically in Fig. 1.

Referring to Fig. 1 of the drawing, the reference numeral 10 denotes generally a latch comprising a saturable reactor 12 having an A.-C. control input and connected in circuit with a rectifier and filter circuit 14 for controlling the operation of a bistable device 15, which in turn operates to control the saturable reactor 12. Set and reset pulses may be applied to the bistable device 18 for initiating operation thereof to either of the two operating conditions, and an output may be derived from the terminal 16 during one operating condition of the bistable device.

Referring to Fig. 2, it will be seen that the saturable reactor 12 comprises a magnetic core 20 having a plurality of windings N1, N2 and N3 thereon. The winding N3 comprises an input winding and may be connected to a suitable source of alternating current, to a pulse circuit, or other suitable periodic voltage source.

The winding N1 is connected in series with a resistor 19 to a suitable direct current source by means of a bistable controllable switch device 15, such as a transistor or a vacuum tube as shown, for effecting saturation of the core 20. The control electrode or grid $g$ of the tube 15 is connected by means of resistors 21 and 22 to the cathode $c$ of the tube in circuit with a source of bias voltage, such as a C battery 24. The battery 24 is so connected as to normally render the grid positive and the tube 15 conductive. The winding N2 is connected by means of a rectifier 25, across the resistor 22, and is provided with a filter capacitor 28 for the purpose of producing a negative bias voltage across the resistor 22 in response to voltage induced in the winding N2 from the input winding N3, when the core 20 is not saturated, for overcoming the positive bias of the battery 24 and rendering the tube 15 nonconductive. The set and reset of input terminal 18 is connected intermediate the resistors 21 and 22 for applying positive and negative pulses to the grid $g$, for respectively rendering the tube 15 conductive and nonconductive. Output signals are derived from the output terminal 16 at the cathode $c$ of the tube 15.

The latch circuit 10 will have two static conditions. In condition one with the tube 15 conducting, current is drawn through the saturating winding N1, saturating the core 20 of the saturable reactor 12. Under these conditions, substantially no voltage is induced in the winding N2 from the input winding N3 and hence, no negative bias voltage appears across the resistor 22. Under these conditions, the grid $g$ of the tube 15 is maintained at a positive voltage substantially equal to the voltage of the C bias battery 24, thus maintaining the tube 15 in the conducting state. Under this condition, because of the voltage developed across a resistor 19, the output terminal 16 is substantially at the voltage of the positive terminal of the direct current source.

When a negative reset pulse is applied to the terminal 18, the grid $g$ will be driven negative, and the tube 15 cuts off. The flow of current through the saturating winding N1 is terminated, and the core 20 of the saturating reactor 12 becomes unsaturated. The alternating current or pulse of voltages applied to the input winding N3 causes a voltage to be induced in the control winding N2. This voltage is rectified and filtered by the rectifier 25 and capacitor 28, causing a negative bias voltage to appear across the resistor 22. The grid $g$ of the tube 15 is thus held negative, and maintains the tube 15 in the cut-off condition, so that the output terminal 16 is therefore at substantially B—. This condition is maintained until a pulse is applied to the terminal 18, which is sufficiently positive to cause the tube 15 to conduct whereupon the latch again switches to the initial static condition of conduction.

In a typical embodiment of the invention, the tube 15 comprises half a type 6350, used with B— at —70 volts and B+ 250 volts. Battery 24 is a 9 volt battery. Reactance 12 comprises a toroid of 7–49 Permalloy, .75 of an inch outside diameter, .5 of an inch inside diameter and .125 of an inch thick. N1 has 600 turns, N2 has 1200 turns and N3 has 400 turns. Resistor 19 is 2000 ohms, resistor 21 is 1000 ohms and resistor 22 is 220,000 ohms. Capacitor 28 is 40 mmfd. With an A.-C. source frequency of 350 kc., a switching time of 10 microseconds is obtained.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention.

It is the intention, therefore, to be limited only as indicated by the scope of the following claims.

What is claimed is:

1. In a latch, a bistable device having two stable conditions, a saturable reactor connected to apply a bias signal to the bistable device to maintain the device in one of said conditions, and circuit means connecting the bistable device to effect saturation of the reactor for retaining the device in its other stable condition.

2. In combination, a saturable reactor having a plurality of windings, a bistable switch device having two stable conditions connected to continuously effect energization in one stable condition of one of said windings to saturate the reactor, means connecting another of said windings to provide a source of bias for maintaining said switch device in its other stable condition, and means for connecting yet another of said windings to a periodic source for inducing a voltage in said another winding.

3. A latch comprising: a saturable reactor having an input winding disposed to be connected to a periodic source, a saturating winding and an output winding; a bistable switch device, connected to effect energization of the saturating winding in a stable conducting condition; and circuit means connecting the output winding to apply a bias potential to maintain the switch device in a stable off condition when the reactor is not saturated.

4. In a latch having stable conducting and nonconducting conditions; a saturable reactor having an input winding for connection to an alternating or pulse current source, a saturating winding and an output winding; an electrode-controlled switch device operable in its conducting condition to connect the saturating winding to a direct current source; means connected to apply a bias voltage to the switch device to maintain it conductive; means for applying signals to the switch device to render it conducting and nonconducting, respectively, and circuit means connecting the output winding to the switch device to render the bias voltage ineffective and hold the device nonconducting when the reactor is unsaturated.

5. A latch comprising: a saturable reactor having a magnetic core with a plurality of mutually inductive windings thereon including an input winding for connection to a source of periodic voltage, a tube connected to effect energization of one winding from a D.-C. source to saturate the core and having a control electrode, means for applying a positive bias to the electrode to maintain the tube conductive, and means connecting another of the windings to apply a negative bias to the electrode for maintaining the tube nonconducting when the core is unsaturated.

6. In a latch having stable on and off conditions; a saturable reactor having an input winding for connection to an A.-C. source and having saturating and output windings, electronic switch means connected to effect energization of the saturating winding from a D.-C. source, and having a control electrode, means for applying a positive bias to the electrode to maintain the switch means on; and means including a rectifier connecting the electrode to the output winding to apply a negative bias to the electrode for maintaining the switch means off.

7. A latch having stable on and off conditions comprising: a saturable reactor having a magnetic core with an input winding for connection to a periodic voltage source and having inductively related output and saturating windings, electronic switch means operable to connect the saturating winding to a D.-C. source and having a control electrode, means connecting the control electrode to a positive bias source for maintaining the switch means conducting to provide the on latch condition, and means including a unidirectional device and a filter capacitor connecting the electrode to the output winding to apply an opposing bias voltage to the electrode when the core is unsaturated for maintaining the switch means nonconducting and providing the off latch condition.

8. In a latch having two stable conditions, a saturable reactor having a magnetic core with a plurality of inductively related windings thereon including a first input winding disposed to be connected to a periodic voltage source, electronic switch means operable when conducting to connect a second one of said windings to a D.-C. source to saturate the core in one of said stable conditions and having a control electrode, circuit means connecting a positive bias source to the control electrode to maintain said switch means conducting, and means including a rectifier and a filter capacitor connected to a third one of said windings to produce a negative bias voltage sufficient to overcome the positive bias when the core is unsaturated and maintain the latch in the other of said stable conditions.

9. A latch having two stable operating conditions comprising: a saturable core reactor having a plurality of windings including an input winding disposed to be connected to an alternating current source, a bistable switch device connected to effect energization of another one of said windings from a direct current source to saturate the reactor core and provide an output signal in one of said stable conditions, said switch device having a control electrode operable to render the device conductive and nonconductive in response to positive and negative pulse signals respectively, circuit means connecting the control electrode to a positive bias source to maintain the device conductive when the core is saturated, and means including a rectifier and a capacitor filter circuit connected between the control electrode and the positive bias source for providing a negative bias voltage to maintain the switch device nonconductive and provide the other stable condition when the reactor core is saturated.

References Cited in the file of this patent

UNITED STATES PATENTS 2,772,357    Wang ---------------- Nov. 27, 1956